United States Patent
Cohen et al.

(10) Patent No.: US 10,285,059 B2
(45) Date of Patent: May 7, 2019

(54) MAC ADDRESS DETERMINATION USING A PERSONAL WLAN

(71) Applicant: Arris Enterprises LLC, Suwanee, GA (US)

(72) Inventors: Elad Cohen, Kiryat Ono (IL); James L. Barr, Silver Spring, MD (US); Maor Conforti, Zikhron Yaakov (IL)

(73) Assignee: ARRIS Enterprises LLC, Suwanee, GA (US)

( * ) Notice: Subject to any disclaimer, the term of this patent is extended or adjusted under 35 U.S.C. 154(b) by 277 days.

(21) Appl. No.: 15/432,847

(22) Filed: Feb. 14, 2017

(65) Prior Publication Data

US 2018/0234848 A1    Aug. 16, 2018

(51) Int. Cl.
| | | |
|---|---|---|
| *H04W 12/08* | (2009.01) | |
| *H04W 76/10* | (2018.01) | |
| *H04L 29/12* | (2006.01) | |
| *H04W 84/12* | (2009.01) | |

(52) U.S. Cl.
CPC ......... *H04W 12/08* (2013.01); *H04L 61/2038* (2013.01); *H04W 76/10* (2018.02); *H04L 61/6022* (2013.01); *H04W 84/12* (2013.01)

(58) Field of Classification Search
CPC ..... H04W 12/08; H04W 76/10; H04W 84/12; H04L 61/2038; H04L 61/6022
See application file for complete search history.

(56) References Cited

U.S. PATENT DOCUMENTS

| | | | | |
|---|---|---|---|---|
| 7,263,076 | B1* | 8/2007 | Leibovitz | H04L 63/10 370/310 |
| 2012/0257536 | A1* | 10/2012 | Kholaif | H04W 48/20 370/254 |

\* cited by examiner

*Primary Examiner* — Duc C Ho
(74) *Attorney, Agent, or Firm* — Stewart M. Wiener; Steven E. Stupp (57) ABSTRACT

After a failed association attempt by an electronic device, an access point may facilitate trouble shooting by determining information associated with the electronic device. For example, the access point may receive at least an instruction from a computer associated with a network administrator to create a personal WLAN having a user-specific SSID. This user-specific SSID may correspond to a user of the electronic device (such as the user's name) or may be independently provided to the user by the network administrator. Then, the electronic device may associate with the access point to join the personal WLAN. In response, the access point may determine the MAC address of the electronic device. Next, the access point may provide the MAC address to the computer, so that the network administrator can identify the electronic device in the WLAN and/or can obtain additional information that can be used to solve the association problem.

20 Claims, 6 Drawing Sheets

MAC ADDRESS DETERMINATION USING A PERSONAL WLAN

BACKGROUND

Field

The described embodiments relate to techniques for communicating information among electronic devices. In particular, the described embodiments relate to techniques for determining an initially unknown the media access control (MAC) address of an electronic device of a user via a personal wireless local area network (WLAN) that has a user-specific service set identifier (SSID).

Related Art

Many electronic devices are capable of wirelessly communicating with other electronic devices. In particular, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth from the Bluetooth Special Interest Group of Kirkland, Wash.), and/or another type of wireless network.

For example, many electronic devices communicate with each other via wireless local area networks (WLANs) using an IEEE 802.11-compatible communication protocol (which are sometimes collectively referred to as 'Wi-Fi'). In a typical deployment, a Wi-Fi-based WLAN includes one or more access points (or basic service sets or BSSs) that communicate wirelessly with each other and with other electronic devices using Wi-Fi, and that provide access to another network (such as the Internet) via IEEE 802.3 (which is sometimes referred to as 'Ethernet').

It can be difficult for a network administrator to efficiently support a remote WLAN. For example, a failure can occur when a user attempts to associate with one of the access points in a WLAN. When the user contacts the network administrator for assistance, the network administrator typically needs to find the user's electronic device (such as their cellular telephone) in the system in order to trouble shoot or solve the problem. This identification is usually based on the MAC address of the user's electronic device.

However, the MAC address of the user's electronic device is often a hidden parameter, which is not easily known or remembered by the user. Consequently, the network administrator may be forced to guide or instruct the user in order for the user to find the MAC address. This time-consuming process is frustrating for the user and the network administrator, and is prone to errors (such as when the user attempts to verbally convey a 12-digit hexadecimal string over the phone). These difficulties can increase the cost of network administration and can degrade the user experience when attempting to communicate using a WLAN.

SUMMARY

The described embodiments relate to an access point that facilitates improved service in a WLAN that includes at least the access point. This access point includes an interface circuit that, during operation, communicates with an electronic device associated with a user and a computer, at a remote location from the access point, which is associated with a network administrator. After a failed attempt by the electronic device to associate with the access point to join a WLAN, the access point may receive at least an instruction from the computer to create a personal WLAN having a user-specific SSID, where the user-specific SSID may correspond to the user or may be independently provided to the user by the network administrator. Then, the access point may create the personal WLAN. Moreover, the access point may communicate with the electronic device as the electronic device associates with the access point to join the personal WLAN. In response to the association, the access point may determine the MAC address of the electronic device. Next, the access point may provide the MAC address to the computer.

Note that the user-specific SSID may be based on the user's name. Moreover, the personal WLAN may be hidden, such that the access point does not broadcast beacons with the user-specific SSID.

Furthermore, the access point may obtain parameters associated with the electronic device, and may provide the parameters to the computer. For example, the parameters may include association information about the failed association attempt, performance information about communication between the electronic device and the access point and/or device information about the electronic device. The association information, the performance information and/or the device information may be used by the network administrator to trouble shoot the failed association attempt.

Additionally, the personal WLAN may have restricted or reduced functionality. For example, only the user may be able to associate the access point to join the personal WLAN. Alternatively or additionally, the personal WLAN may only be able to access a diagnostic network and/or may be unable to access the Internet.

In some embodiments, the access point receives a passcode from the electronic device prior to the association with the personal WLAN, and the association with the personal WLAN is based on the passcode (e.g., the passcode may be needed in order for the electronic device to associate with the access point to join the personal WLAN).

Moreover, the access point may include: a processor; and a memory, coupled to the processor, which stores a program module that, during operation, is executed by the processor. The program module may include instructions for at least some of the operations performed by the access point.

Another embodiment provides the computer. This computer may provide the instruction to create the personal WLAN having the user-specific SSID to one or more access points in the WLAN, including the access point. The computer may provide the instruction based on user-interface activity of the network administrator. For example, the network administrator may activate an icon in a user interface on the computer in response to a request for assistance from the user after the failed association attempt.

Another embodiment provides the electronic device that performs counter-part operations to those performed by the access point.

Another embodiment provides a computer-program product for use with the access point, the computer or the electronic device. This computer-program product includes instructions for at least some of the operations performed by the access point, the computer or the electronic device.

Another embodiment provides a method. This method includes at least some of the operations performed by the access point, the computer or the electronic device.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

After a failed attempt by an electronic device to associate with an access point to join a WLAN, the access point may facilitate trouble shooting by determining information about or associated with the electronic device. For example, the access point may receive at least an instruction or a command from a computer associated with a network administrator to create a personal WLAN having a user-specific SSID. This user-specific SSID may correspond to a user of the electronic device (such as the user's name) or may be independently provided to the user by the network administrator. Then, the electronic device may associate with the access point to join the personal WLAN. In response, the access point may determine the MAC address of the electronic device. Next, the access point may provide the MAC address to the computer, so that the network administrator can identify the electronic device in the WLAN and/or can obtain additional information that can be used to solve the association problem.

By determining the MAC address of the electronic device via the personal WLAN, this communication technique may facilitate more efficient problem solving. For example, the communication technique may eliminate the need for the network administrator to instruct or guide the user on how to find the MAC address of the electronic device. Consequently, the communication technique may reduce the time and effort needed to solve the association problem, thereby reducing the cost of network administration, reducing user and network administrator frustration, and improving the user experience when attempting to communicate using a WLAN.

In the discussion that follows, the electronic device and the access point communicate packets in accordance with a communication protocol, such as an Institute of Electrical and Electronics Engineers (IEEE) 802.11 standard (which is sometimes referred to as 'Wi-Fi,' from the Wi-Fi Alliance of Austin, Tex.), Bluetooth (from the Bluetooth Special Interest Group of Kirkland, Wash.), and/or another type of wireless interface. In the discussion that follows, Wi-Fi is used as an illustrative example. However, a wide variety of communication protocols (such as Long Term Evolution or LTE, another cellular-telephone communication protocol, etc.) may be used.

Figure 1:
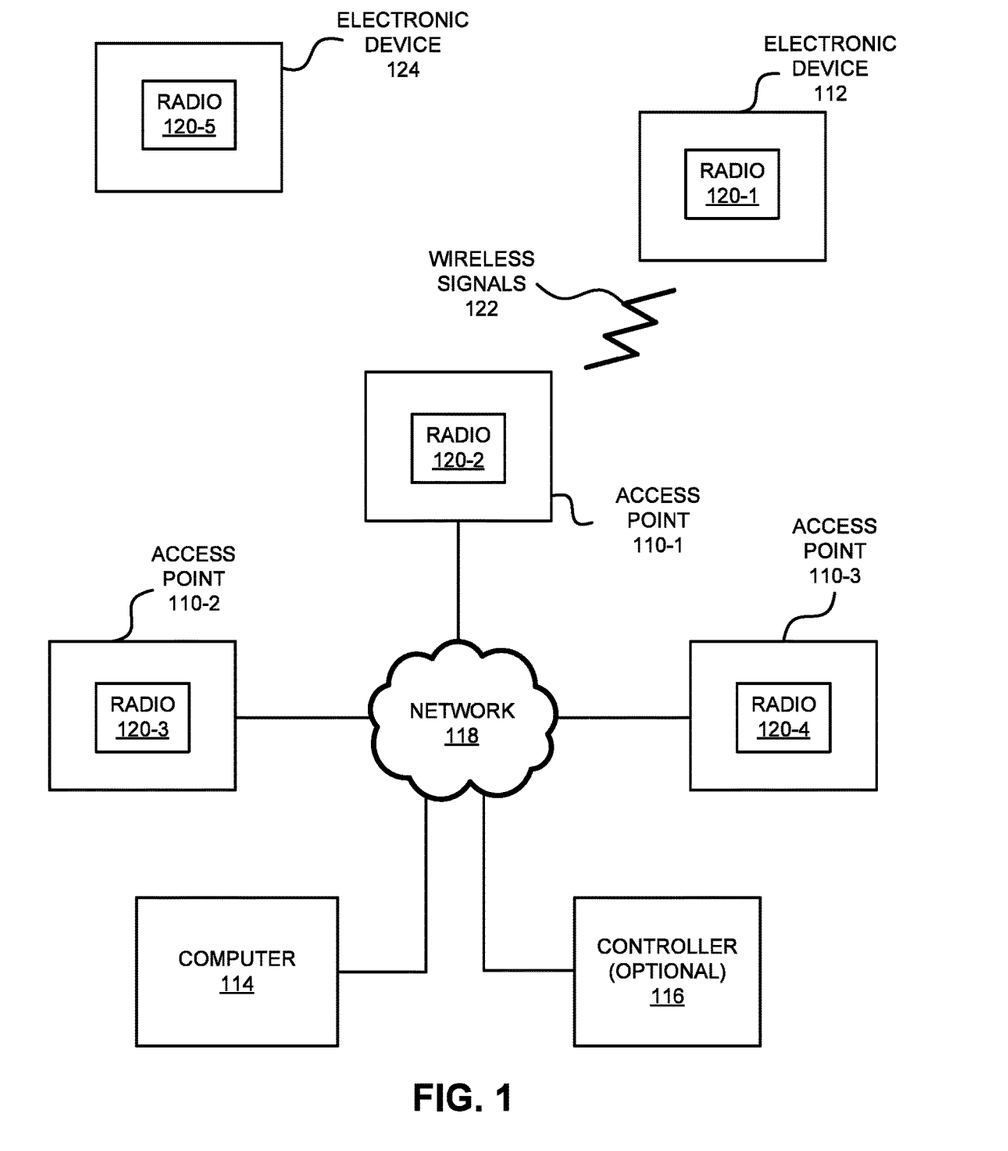
FIG. 1 is a drawing illustrating communication among access points and an electronic device in a wireless local area (WLAN) in accordance with an embodiment of the present disclosure.

FIG. 1 presents a drawing illustrating communication among one or more access points (APs) 110 and an electronic device 112 (such as a cellular telephone) in a WLAN 100 in accordance with some embodiments. In particular, access points 110 may communicate with each other using wireless and/or wired communication, and access points 110 may communicate with computer 114 (such as a computer, a server or an access control system) and/or optional controller 116. (However, in some embodiments, optional controller 116 is a virtual controller, such as a controller than is implemented in software in an environment on a server.) In addition, at least some of access points 110 may communicate with electronic device 112 using wireless communication.

The wired communication may occur via network 118 (such as an intra-net, a mesh network, point-to-point connections and/or the Internet) and may use a network communication protocol, such as Ethernet. Moreover, the wireless communication using Wi-Fi may involve: transmitting advertising frames on wireless channels, detecting one another by scanning wireless channels, establishing connections (for example, by transmitting association or attach requests), and/or transmitting and receiving packets (which may include the association requests and/or additional information as payloads). In some embodiments, the wireless communication among access points 110 also involves the use of dedicated connections.

Figure 6:
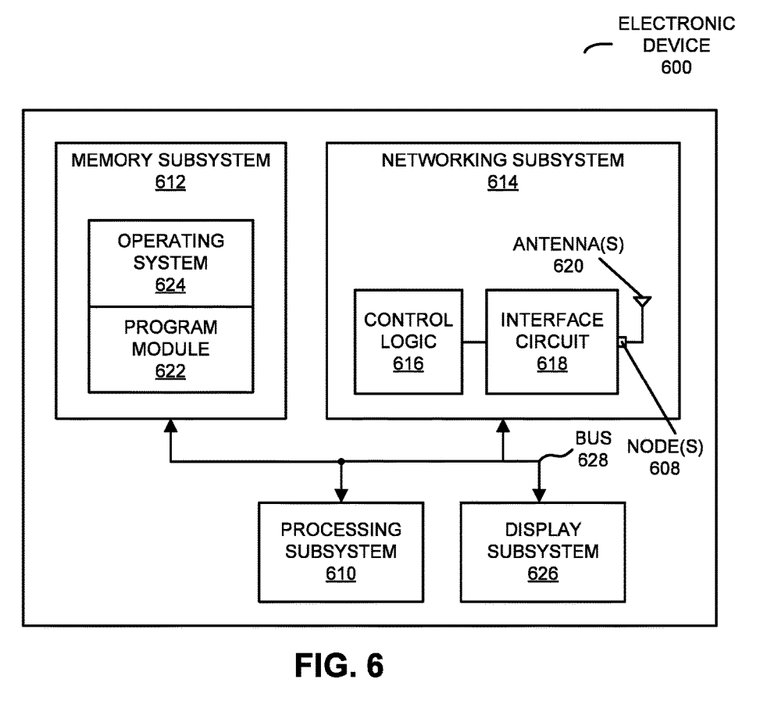
FIG. 6 is a block diagram illustrating an electronic device in accordance with an embodiment of the present disclosure.

As described further below with reference to FIG. 6, access points 110, electronic device 112, computer 114 and/or optional controller 116 may include subsystems, such as a networking subsystem, a memory subsystem and a processor subsystem. In addition, access points 110 and electronic device 112 may include radios 120 in the networking subsystems. More generally, access points 110 and electronic device 112 can include (or can be included within) any electronic devices with the networking subsystems that enable access points 110 and electronic device 112 to wirelessly communicate with each other. This wireless communication can comprise transmitting advertisements on wireless channels to enable access points and/or electronic devices to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 120 are shown in access points 110 and electronic device 112, one or more of these instances may be different from the other instances of radios 120.

As can be seen in FIG. 1, wireless signals 122 (represented by a jagged line) are transmitted from radio 120-1 in electronic device 112. These wireless signals may be received by radio 120-2 in access point 110-1. In particular, electronic device 112 may transmit packets. In turn, these packets may be received by access point 110-1. Moreover, access point 110-1 may allow electronic device 112 to communicate with other electronic devices, computers and/or servers via network 118.

Note that the communication among access points 110 and/or with electronic device 112 may be characterized by a variety of performance metrics, such as: a received signal strength (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In the described embodiments processing a packet or frame in access points 110 and electronic device 112 includes: receiving wireless signals 122 with the packet or frame; decoding/extracting the packet or frame from received wireless signals 122 to acquire the packet or frame; and processing the packet or frame to determine information contained in the packet or frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

Figure 2:
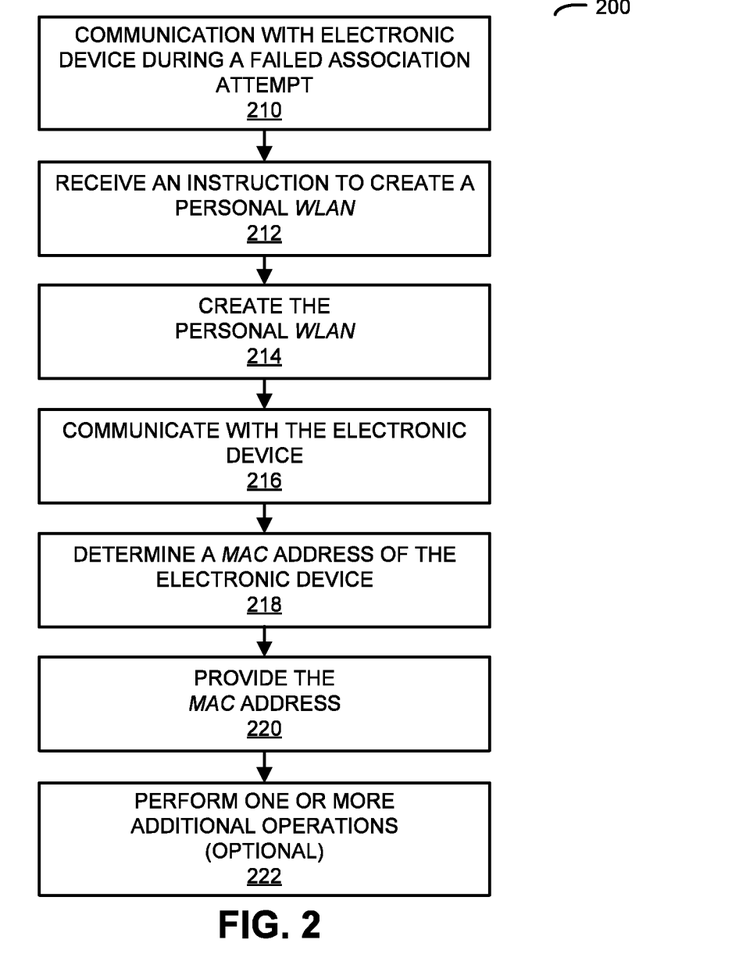
FIG. 2 is a flow diagram illustrating a method for determining a media access control (MAC) address of an electronic device in accordance with an embodiment of the present disclosure.

As described further below with reference to FIGS. 2-4, sometimes an attempt by a user of electronic device 112 to associate with access point 110-1 to join a WLAN fails. When this occurs, the user may contact a network administrator who is associated with or that uses computer 114. For example, the user may place a phone call to the network administrator. As noted previously, in order to trouble shoot the failed association attempt, the network administrator may need to identify electronic device 112 (including a location of electronic device 112, such as the proximate or nearby access point 110-1) and/or may need to obtain information about or associated with electronic device 112 (such as access information about the failed association attempt, performance information about the communication between electronic device 112 and access point 110-1 and/or device information about electronic device 112).

In order to facilitate the trouble shooting, the communication technique may allow the network administrator to determine a MAC address of electronic device 112 and/or the information about or associated with electronic device 112. In particular, after the user calls or contacts the network administrator or after computer 114 receives information that indicates there was a failed association attempt by electronic device 112 (e.g., from access point 110-1 or from electronic device 112 using another communication technique than the WLAN, such as a cellular-telephone communication technique), computer 114 may provide, via network 118, at least an instruction to at least access point 110-1 (and, sometimes, to multiple access points 110, such as when access points 110 are in a venue or an environment) to create a personal WLAN having a user-specific SSID. Then, at least access point 110-1 create the personal WLAN. Note that the personal WLAN may be temporary, e.g., the personal WLAN may be deactivated after a time interval (such as 5, 10, 30 or 60 min) has elapsed or when the cause of the failed association attempt has been resolved or corrected.

In some embodiments, the network administrator instructs computer 114 to provide the instruction to electronic device 112. For example, as described further below with reference to FIG. 5, based on the information about the failed association attempt from the user, the network administrator may press a physical button or may activate a virtual icon by applying pressure within a corresponding strike area in a user interface. After receiving an associated user-interface command, computer 114 may provide the instruction to access point 110-1.

Note that the user-specific SSID may correspond to the user. For example, the user-specific SSID may be based on the user's name, such as the user's first name ("John"). Alternatively, the user-specific SSID may be predefined (such as 'AAA') or may be something that the user is more likely to know (such as the name of the user's child or pet).

Moreover, the network administrator and/or computer 114 may optionally provide the user-specific SSID to the user and/or electronic device 112. For example, the network administrator may verbally tell the user the user-specific SSID during a phone call. Alternatively or additionally, computer 114 may provide (e.g., via network 118) the user-specific SSID to electronic device 112 via the other communication technique than the WLAN, such as using a cellular-telephone communication technique (e.g., using out-of-band communication from the WLAN).

In response, electronic device 112 may communicate with access point 10-1 as electronic device 112 associates with access point 110-1 to join the personal WLAN. After the successful association, access point 110-1 may determine the MAC address of electronic device 112 (such as in a MAC header in a frame received from electronic device 112), and access point 110-1 may provide, via network 118, the MAC address to computer 114. In some embodiments, access point 110-1 further obtains parameters or information associated with electronic device 112, and then provides, via network 118, the parameters or information to computer 114 for use in trouble shoot the failed association attempt. For example, the parameters may include association information about the failed association attempt (such as login information, a local Internet Protocol or IP address, a public IP address, a host name from Dynamic Host Configuration Protocol fingerprinting, etc.), performance information about communication between electronic device 112 and access point 110-1 (such as one or more of the communication-performance metrics described previously, e.g., a bandwidth, a latency, a channel, etc.) and/or device information about electronic device 112 (such as an operating system, a manufacturer, behavior or performance associated with an application executing on electronic device 112, a history of prior failures during association attempts by electronic device 112 as well as their causes, etc.).

In some embodiments, the parameters or information is obtained by an application that is installed on and that executes in an environment of electronic device 112. For example, the application may be pre-installed on electronic device 112 or may be installed by computer 114, via network 118, after electronic device 112 has joined the personal WLAN and computer has received the MAC address. In addition, computer 114 may, via network 118, tag electronic device 112 for easy and quick subsequent identified, such as by setting a flag in software on electronic device 112 or installing a cookie or the tag on electronic device 112.

Next, the network administrator or computer 114 may trouble shoot the failed association attempt (i.e., in a semi-automated or an automated manner), so that electronic device 112 is able to associate with access point 110-1 to join the WLAN.

In order to prevent or reduce the likelihood that another electronic device 124, which is associated with another user, inadvertently associating with access point 110-1 to join the personal WLAN before electronic device 112 completes the association (which may confuse the network administrator or which could confound the communication technique), the personal WLAN may be hidden. For example, access point 110-1 may not broadcast beacons with the user-specific SSID. Instead, the user may only be able to find the personal WLAN if the user knows the user-specific SSID, such as if the user is told the user-specific SSID by the network administrator and/or electronic device 112 receives the user-specific SSID from computer 114 via the other communication technique.

Moreover, the personal WLAN may have restricted or reduced functionality, so that the personal WLAN is of less interest to other users. This reduced functionality may include restricted access to the Internet or a fixed number of devices that are allowed to simultaneously connect to the personal WLAN. For example, only electronic device 112 may be able to associate with access point 110-1 to join the personal WLAN. In particular, after electronic device 112 joins the personal WLAN, no other electronic devices may be able to associate with access point 110-1 to join the personal WLAN (i.e., the other electronic devices may be blocked from joining). Note that by isolating electronic device 112 in the personal WLAN from a remainder of network 118 and/or other electronic devices, the personal WLAN may further facilitate the trouble shooting of the failed association attempt. Alternatively or additionally, the personal WLAN may not have other useful services. Thus, electronic device 112 may only be able to access a diagnostic network via the personal WLAN (instead of being able to access the Internet) and/or the personal WLAN may have a restricted or limited data rate, which is sufficient to communicate the MAC address or the parameters, but which is insufficient for other applications or services. In some embodiments, computer 114 may be able to instruct access point 110-1 to de-associate from electronic device 124 so that electronic device 124 no longer has access to the personal WLAN in the event that electronic device 124 inadvertently joined the personal WLAN.

In addition, the network administrator or computer 114 may provide, via network 118, information to electronic device 112 that uniquely identifies electronic device 112 and/or that confirms that electronic device 112 is supposed to associate with access point 110-1 to join the personal WLAN (as opposed to electronic device 124). For example, the network administrator may tell the user a passcode that is unique to electronic device 112 during a phone call, and the user may, via electronic device 112, provide the passcode to access point 110-1 prior to electronic device 112 associating with the personal WLAN. Alternatively or additionally, computer 114 may provide, via network 118, the passcode to electronic device 112. For example, the passcode may be included on a webpage that is displayed on a web browser or the passcode may be communicated to electronic device 112 via the cellular-telephone communication technique.

In this way, the communication technique may allow the network administrator to efficiently address the problem that caused the failed association attempt. Thus, the communication technique may reduce costs and may improve customer service. In some embodiments, the communication technique is semi-automated, e.g., it may involve communication between the network administrator and the user via a phone call, the user entering or providing the user-specific SSID or the passcode, etc. Alternatively, the communication technique may be fully automated and may not require that the user call or directly contact the network administrator, etc. In some embodiments, the user of electronic device 112 can self-diagnose and correct the problem that caused the failed association attempt by interacting with an automated instance of computer 114 during the communication technique. Furthermore, if electronic device 112 has experienced a predefined number of failed association attempts during a time interval (such as 3 failures within 60 min), computer 114 may perform the communication technique in order to trouble shoot the problem.

We now describe embodiments of the method. FIG. 2 presents a flow diagram illustrating a method 200 for determining a MAC address of an electronic device, which may be performed by an access point, such as access point 110-1 in FIG. 1. During operation, the access point may communicate with the electronic device in a failed attempt by the electronic device to associate (operation 210) with the access point to join a WLAN. After the failed association attempt, the access point may receive at least an instruction from a computer associated with a network administrator to create a personal WLAN (operation 212) having a user-specific SSID. Then, the access point may create the personal WLAN (operation 214). Moreover, the access point may communicate with the electronic device (operation 216) as the electronic associates with the access point to join the personal WLAN. After the successful association, the access point determines the MAC address of the electronic device (operation 218), and provides the MAC address (operation 220) to the computer.

In some embodiments, the access point optionally performs one or more additional operations (operation 222). For example, the access point may obtain parameters associated with the electronic device, and may provide the parameters to the computer. Alternatively or additionally, the access point may receive a passcode from the electronic device prior to the association with the personal WLAN, and the association with the personal WLAN may be based on the passcode.

Figure 3:
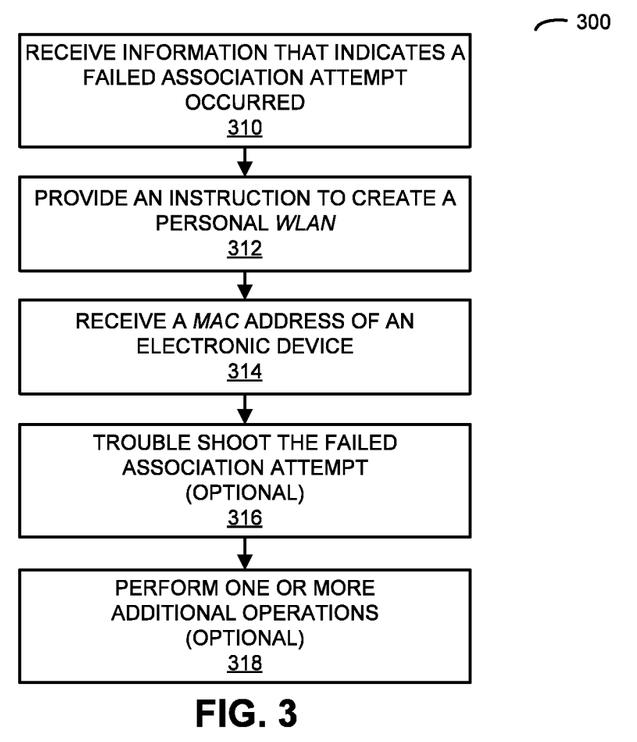
FIG. 3 is a flow diagram illustrating a method for determining a MAC address of an electronic device in accordance with an embodiment of the present disclosure.

FIG. 3 presents a flow diagram illustrating a method 300 for determining a MAC address of an electronic device, which may be performed by a computer, such as computer 114 in FIG. 1. During operation, the computer may receive information (operation 310) that indicates a failed attempt by the electronic device to associate with an access point to join a WLAN. Then, the computer may provide at least an instruction to the access point to create a personal WLAN (operation 312) having a user-specific SSID. After the electronic device associates with the access point to join the personal WLAN, the computer may receive, from the access point, a MAC address of the electronic device (operation 314). Next, the computer may optionally trouble shoot the failed association attempt (operation 316) by the electronic device based, at least in part, on the MAC address.

In some embodiments, the computer optionally performs one or more additional operations (operation 318). For example, the computer may receive a user-interface command from a network administrator (such as when the network administrator activates a button or a virtual icon in a user interface), and in response the computer may provide the instruction to the access point. Moreover, the computer may provide the user-specific SSID to the user or the electronic device prior to the electronic device associating with the personal WLAN. Furthermore, in addition to the MAC address, the computer may receive parameters associated with the electronic device, which are used to trouble shoot the failed association attempt. Additionally, the computer may provide a passcode to the electronic device prior to the electronic device associating with the personal WLAN.

In some embodiments of methods 200 (FIG. 2) and/or 300, there may be additional or fewer operations. Furthermore, the order of the operations may be changed, and/or two or more operations may be combined into a single operation.

Figure 4:
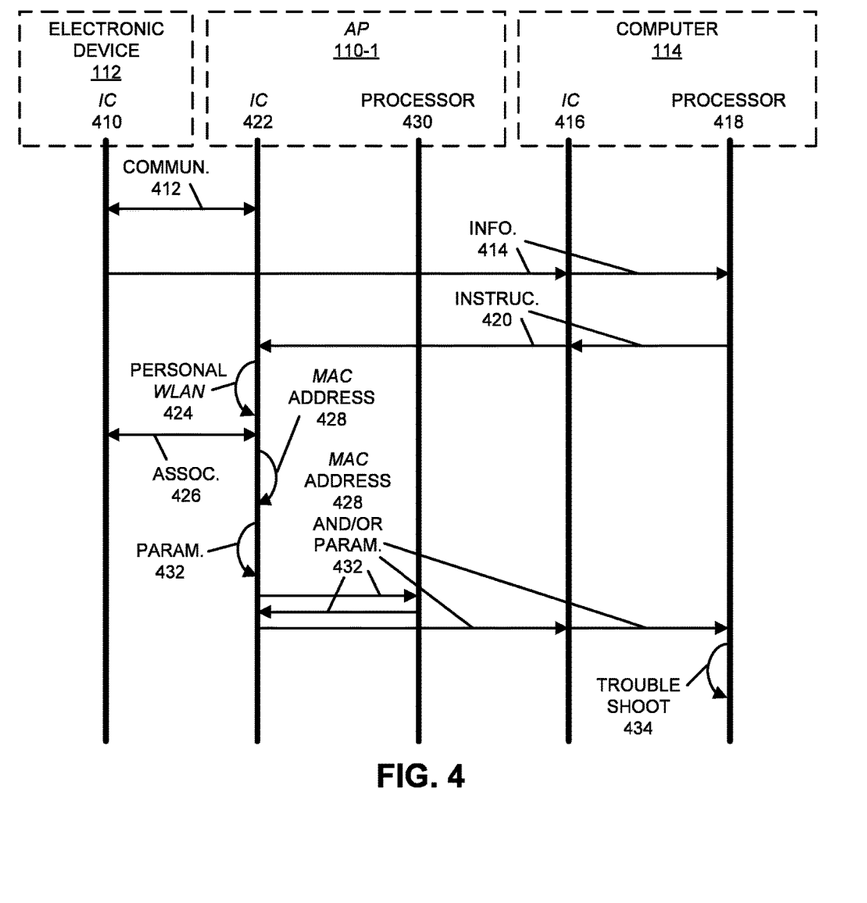
FIG. 4 is a drawing illustrating communication among the electronic devices in FIG. 1 in accordance with an embodiment of the present disclosure.

Embodiments of the communication technique are further illustrated in FIG. 4, which presents a drawing illustrating communication among access point 110-1, electronic device 112, and computer 114 in accordance with some embodiments. In particular, an interface circuit (IC) 410 in electronic device 112 may communicate 412 with access point 110-1 in an attempt to join or associate with a WLAN. If the association attempt fails, interface circuit 410 may communicate information 414 with computer 114 that indicates the failed association attempt. After receiving information 414, interface circuit 416 in computer 114 may provide information 414 to processor 418 in computer 114.

In response to information 414, processor 418 may, via interface circuit 416, provide an instruction 420 for a personal WLAN 424 having a user-specific SSID to access point 110-1. Moreover, after receiving instruction 420, interface circuit 422 in access point 110-1 may create personal WLAN 424.

Next, interface circuit 410 may associate 426 with access point 110-1 to join the personal WLAN 424 by communicating with interface circuit 422. After the association 426, interface circuit 422 may determine MAC address 428 of electronic device 112, and may provide MAC address 428 to processor 430 in access point 110-1. In response, processor 430 may instruct interface circuit 422 to provide MAC address 428 to computer 114. In addition, interface circuit 422 and/or processor 430 may determine parameters 432 associated with electronic device 112, and interface circuit 422 may provide parameters 432 to computer 114

After receiving MAC address 428 and/or parameters 432, interface circuit 416 may provide MAC address 428 and/or parameters 432 to processor 418, which uses this and other related information to trouble shoot 434 the failed association attempt.

While FIG. 4 illustrates operations in the communication technique as involving unilateral or bilateral communication, in general an arbitrary operation in the communication technique may involve unilateral or bilateral communication in at least some embodiments.

Figure 5:
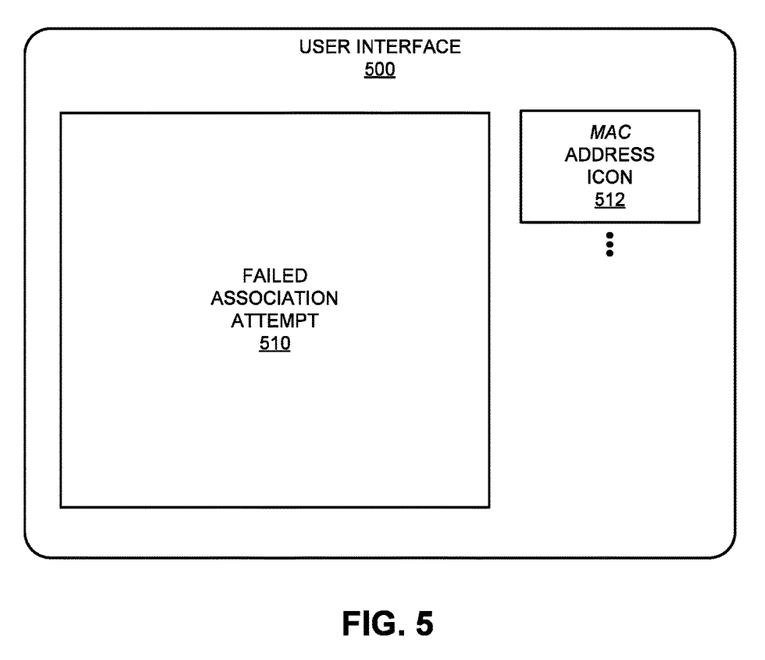
FIG. 5 is a drawing illustrating a user interface in a computer in FIG. 1 in accordance with an embodiment of the present disclosure.

FIG. 5 presents a drawing illustrating a user interface 500 in computer 114 (FIG. 1). A network administrator at a help desk may use user interface 500 to efficiently handle a report of a failed association attempt 510. In particular, the network administrator may activate MAC address icon 512 by pressing a physical button (such as on a keyboard), clicking on icon 512 using a mouse, or contacting a strike area associated with virtual icon in user interface 500. In response, computer 114 (FIG. 1) may provide at least an instruction to access point 110-1 (FIG. 1) to create the personal WLAN. In this way, user interface 500 may allow the network administrator to quickly and with minimal effort determine the MAC address of electronic device 112 (FIG. 1).

While the preceding examples illustrated the communication technique in conjunction with a failed association attempt, more generally the communication technique may be used with a wide variety of problems, such as communication problems and/or access problems (such as a failed login attempt). Thus, the communication technique may be used by the network administrator to efficiently identify the user and/or their electronic device, so that the network administrator can trouble shoot or correct the problem that the user is experiencing.

Moreover, while numerical values are provided in the preceding examples, these numerical values are for purposes of illustration only. Other numerical values may be used in some embodiments.

We now describe embodiments of an electronic device, which may perform at least some of the operations in the communication technique. FIG. 6 presents a block diagram illustrating an electronic device 600 in accordance with some embodiments, such as one of access points 110, electronic device 112, computer 114 or optional controller 116. This electronic device includes processing subsystem 610, memory subsystem 612, and networking subsystem 614. Processing subsystem 610 includes one or more devices configured to perform computational operations. For example, processing subsystem 610 can include one or more microprocessors, ASICs, microcontrollers, programmable-logic devices, and/or one or more digital signal processors (DSPs).

Memory subsystem 612 includes one or more devices for storing data and/or instructions for processing subsystem 610 and networking subsystem 614. For example, memory subsystem 612 can include dynamic random access memory (DRAM), static random access memory (SRAM), and/or other types of memory. In some embodiments, instructions for processing subsystem 610 in memory subsystem 612 include: one or more program modules or sets of instructions (such as program module 622 or operating system 624), which may be executed by processing subsystem 610. Note that the one or more computer programs may constitute a computer-program mechanism. Moreover, instructions in the various modules in memory subsystem 612 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 610.

In addition, memory subsystem 612 can include mechanisms for controlling access to the memory. In some embodiments, memory subsystem 612 includes a memory hierarchy that comprises one or more caches coupled to a memory in electronic device 600. In some of these embodiments, one or more of the caches is located in processing subsystem 610.

In some embodiments, memory subsystem 612 is coupled to one or more high-capacity mass-storage devices (not shown). For example, memory subsystem 612 can be coupled to a magnetic or optical drive, a solid-state drive, or another type of mass-storage device. In these embodiments, memory subsystem 612 can be used by electronic device 600 as fast-access storage for often-used data, while the mass-storage device is used to store less frequently used data.

Networking subsystem 614 includes one or more devices configured to couple to and communicate on a wired and/or wireless network (i.e., to perform network operations), including: control logic 616, an interface circuit 618 and one or more antennas 620 (or antenna elements). (While FIG. 6 includes one or more antennas 620, in some embodiments electronic device 600 includes one or more nodes, such as nodes 608, e.g., a pad, which can be coupled to the one or more antennas 620. Thus, electronic device 600 may or may not include the one or more antennas 620.) For example, networking subsystem 614 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 614 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 600 may use the mechanisms in networking subsystem 614 for performing simple wireless communication between the electronic devices, e.g., transmitting advertising or beacon frames and/or scanning for advertising frames transmitted by other electronic devices as described previously.

Within electronic device 600, processing subsystem 610, memory subsystem 612, and networking subsystem 614 are coupled together using bus 628. Bus 628 may include an electrical, optical, and/or electro-optical connection that the subsystems can use to communicate commands and data among one another. Although only one bus 628 is shown for clarity, different embodiments can include a different number or configuration of electrical, optical, and/or electro-optical connections among the subsystems.

In some embodiments, electronic device 600 includes a display subsystem 626 for displaying information on a display, which may include a display driver and the display, such as a liquid-crystal display, a multi-touch touchscreen, etc.

Electronic device 600 can be (or can be included in) any electronic device with at least one network interface. For example, electronic device 600 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, an access point, a controller, test equipment, and/or another electronic device.

Although specific components are used to describe electronic device 600, in alternative embodiments, different components and/or subsystems may be present in electronic device 600. For example, electronic device 600 may include one or more additional processing subsystems, memory subsystems, networking subsystems, and/or display subsystems. Additionally, one or more of the subsystems may not be present in electronic device 600. Moreover, in some embodiments, electronic device 600 may include one or more additional subsystems that are not shown in FIG. 6. Also, although separate subsystems are shown in FIG. 6, in some embodiments some or all of a given subsystem or component can be integrated into one or more of the other subsystems or component(s) in electronic device 600. For example, in some embodiments program module 622 is included in operating system 624 and/or control logic 616 is included in interface circuit 618.

Moreover, the circuits and components in electronic device 600 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 614. The integrated circuit may include hardware and/or software mechanisms that are used for transmitting wireless signals from electronic device 600 and receiving signals at electronic device 600 from other electronic devices. Aside from the mechanisms herein described, radios are generally known in the art and hence are not described in detail. In general, networking subsystem 614 and/or the integrated circuit can include any number of radios. Note that the radios in multiple-radio embodiments function in a similar way to the described single-radio embodiments.

In some embodiments, networking subsystem 614 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 622, operating system 624 (such as a driver for interface circuit 618) or in firmware in interface circuit 618. Alternatively or additionally, at least some of the operations in the communication technique may be implemented in a physical layer, such as hardware in interface circuit 618.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An access point, comprising:
    an interface circuit that is configured to communicate with an electronic device and a computer at a remote location from the access point, wherein the access point is configured to:
    communicate with the electronic device in a failed attempt by the electronic device to associate with the access point to join a wireless local area network (WLAN);
    after the failed association attempt, receive an instruction from the computer to create a personal WLAN having a user-specific service set identifier (SSID);
    create the personal WLAN;
    communicate with the electronic device as the electronic associates with the access point to join the personal WLAN;
    after the successful association, determine a media access control (MAC) address of the electronic device; and
    provide the MAC address to the computer.

2. The access point of claim 1, wherein the user-specific SSID corresponds to a user who is associated with the electronic device.

3. The access point of claim 1, wherein the user-specific SSID is based on a name of a user who is associated with the electronic device.

4. The access point of claim 1, wherein the personal WLAN is hidden and the access point does not broadcast beacons with the user-specific SSID.

5. The access point of claim 1, wherein the access point is further configured to:
    obtain parameters associated with the electronic device; and
    provide the parameters to the computer.

6. The access point of claim 1, wherein the access point is further configured to provide parameters to the computer, the parameters including at least one of: association information about the failed association attempt, performance information about communication between the electronic device and the access point and device information about the electronic device.

7. The access point of claim 1, wherein the personal WLAN has restricted or reduced functionality.

8. The access point of claim 1, wherein only the electronic device is able to associate with the access point to join the personal WLAN.

9. The access point of claim 1, wherein the personal WLAN is only able to access a diagnostic network or is unable to access the Internet.

10. The access point of claim 1, wherein the access point is further configured to receive a passcode from the electronic device prior to the association with the personal WLAN; and
    wherein the association with the personal WLAN is based on the passcode.

11. The access point of claim 1, wherein the access point further comprises:
    a processor; and
    a memory, coupled to the processor, which stores instructions that, when executed by the processor, cause the processor to perform at least some of the operations performed by the access point.

12. A method for determining a media access control (MAC) address of an electronic device, wherein the method comprises:
    by an access point:
    communicating with the electronic device in a failed attempt by the electronic device to associate with the access point to join a wireless local area network (WLAN);
    after the failed association attempt, receiving an instruction from a computer to create a personal WLAN having a user-specific service set identifier (SSID);
    creating the personal WLAN;
    communicating with the electronic device as the electronic associates with the access point to join the personal WLAN;
    after the successful association, determining the MAC address of the electronic device; and
    providing the MAC address to the computer.

13. A computer, comprising:
    an interface circuit that is configured to communicate with an electronic device and an access point at a remote location from the computer, wherein the computer is configured to:
    receive information that indicates a failed attempt by the electronic device to associate with the access point to join a wireless local area network (WLAN);
    provide an instruction to the access point to create a personal WLAN having a user-specific service set identifier (SSID);
    after the electronic device associates with the access point to join the personal WLAN, receive, from the access point, a media access control (MAC) address of the electronic device; and
    trouble shoot the failed association attempt by the electronic device based, at least in part, on the MAC address.

14. The computer of claim 13, wherein the user-specific SSID corresponds to a user who is associated with the electronic device.

15. The computer of claim 13, wherein the user-specific SSID is based on a name of a user who is associated with the electronic device.

16. The computer of claim 13, wherein the computer is further configured to provide the user-specific SSID to the user or the electronic device.

17. The computer of claim 13, wherein the computer is further configured to receive a user-interface command from a network administrator; and wherein the providing of the instruction is based on the user-interface command.

18. The computer of claim 13, wherein the computer is further configured to receive parameters associated with the electronic device; and wherein the trouble shooting is further based on the parameters.

19. The computer of claim 13, wherein the access point is further configured to provide parameters to the computer, the parameters including at least one of: association information about the failed association attempt, performance information about communication between the electronic device and the access point and device information about the electronic device.

20. The computer of claim 13, wherein the computer is further configured to provide a passcode to the electronic device prior to the electronic device associating with the personal WLAN.

\* \* \* \* \*